(12) United States Patent
Takemoto et al.

(10) Patent No.: US 10,316,733 B2
(45) Date of Patent: Jun. 11, 2019

(54) PRECOMBUSTION-CHAMBER ENGINE

(71) Applicant: MITSUBISHI HEAVY INDUSTRIES ENGINE & TURBOCHARGER, LTD., Sagamihara-shi, Kanagawa (JP)

(72) Inventors: Daisuke Takemoto, Tokyo (JP); Akihiro Yuuki, Tokyo (JP); Shunya Sasaki, Tokyo (JP); Kazuo Ogura, Tokyo (JP); Yuta Furukawa, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 0 days.

(21) Appl. No.: 15/761,758

(22) PCT Filed: Dec. 9, 2016

(86) PCT No.: PCT/JP2016/086664
§ 371 (c)(1),
(2) Date: Mar. 20, 2018

(87) PCT Pub. No.: WO2017/110516
PCT Pub. Date: Jun. 29, 2017

(65) Prior Publication Data
US 2018/0258834 A1    Sep. 13, 2018

(30) Foreign Application Priority Data
Dec. 21, 2015    (JP) .................................. 2015-248180

(51) Int. Cl.
*F02B 19/16*    (2006.01)
*F02B 19/08*    (2006.01)
(Continued)

(52) U.S. Cl.
CPC .......... *F02B 19/08* (2013.01); *F02B 19/1014* (2013.01); *F02B 19/1095* (2013.01);
(Continued)

(58) Field of Classification Search
CPC ...... F02B 19/08; F02B 19/14; F02B 19/1014; F02B 19/16; F02B 19/1095; F02B 19/12; F02B 19/18; F02P 19/00
(Continued)

(56) References Cited

U.S. PATENT DOCUMENTS 3,220,389 A * 11/1965 Van Rinsum ........... F02B 19/14
123/268
4,091,772 A *  5/1978 Heater ................ F02B 19/1009
123/255
(Continued)

FOREIGN PATENT DOCUMENTS

EP    3 118 433 A1    1/2017
EP    3 176 423 A1    6/2017
(Continued)

OTHER PUBLICATIONS

International Preliminary Report on Patentability and Written Opinion of the International Searching Authority (Forms PCT/IB/338, PCT/IB/373 and PCT/ISA/237) for International Application No. PCT/JP2016/086664, dated Jul. 5, 2018, with English translation.
(Continued)

*Primary Examiner* — Hai H Huynh
(74) *Attorney, Agent, or Firm* — Birch, Stewart, Kolasch & Birch, LLP

(57) ABSTRACT

A precombustion-chamber engine includes a cylinder, a cylinder head disposed on a top of the cylinder, and a piston reciprocably disposed within the cylinder. A main combustion chamber is defined between the piston and the cylinder head. The cylinder head includes a precombustion-chamber
(Continued)

forming part which defines a precombustion chamber communicating with the main combustion chamber through a nozzle. The precombustion chamber includes a cylindrical first passage part extending upwardly from the nozzle, a second passage part extending upwardly from the first passage part and having an upwardly-increasing cross-sectional area, and a cylindrical space part which extends upwardly from the second passage part and in which a spark plug is disposed. Center O of a cross-section, orthogonal to straight line L, of the second passage part is eccentric with respect to straight line L composed of an axis of the first passage part and an extended line of the axis.

6 Claims, 9 Drawing Sheets

(51) Int. Cl.
| | | |
|---|---|---|
| *F02B 19/12* | (2006.01) | |
| *F02B 19/18* | (2006.01) | |
| *F02B 19/10* | (2006.01) | |
| *F02B 19/14* | (2006.01) | |
| *F02P 13/00* | (2006.01) | |

(52) U.S. Cl.
CPC .............. *F02B 19/12* (2013.01); *F02B 19/14* (2013.01); *F02B 19/16* (2013.01); *F02B 19/18* (2013.01); *F02P 13/00* (2013.01); *Y02T 10/125* (2013.01)

(58) Field of Classification Search
USPC ......................................... 123/262, 263, 285
See application file for complete search history.

(56) References Cited

U.S. PATENT DOCUMENTS

| | | | | |
|---|---|---|---|---|
| 4,292,935 A | * | 10/1981 | Wagner | F02B 19/14 123/275 |
| 4,347,814 A | * | 9/1982 | Besslein | F02B 19/14 123/261 |
| 4,444,166 A | * | 4/1984 | Kovacs | F02B 3/00 123/1 A |
| 4,646,695 A | * | 3/1987 | Blackburn | F02B 19/12 123/256 |
| 4,903,656 A | * | 2/1990 | Nakazono | F02B 19/1014 123/253 |
| 5,105,780 A | * | 4/1992 | Richardson | H01T 13/54 123/169 PA |
| 5,947,076 A | * | 9/1999 | Srinivasan | F02B 19/12 123/256 |
| 7,387,103 B2 | * | 6/2008 | Merritt | F02B 19/08 123/253 |
| 7,950,364 B2 | * | 5/2011 | Nerheim | F02B 19/1014 123/259 |
| 9,151,212 B2 | * | 10/2015 | Dumser | F02B 19/1014 |
| 9,316,144 B2 | * | 4/2016 | Gruber | F02B 23/04 |
| 9,353,674 B2 | * | 5/2016 | Bunce | F02B 19/1057 |
| 9,816,430 B2 | * | 11/2017 | Yuuki | F02B 19/08 |
| 10,006,433 B2 | * | 6/2018 | Kanehara | F02B 19/12 |
| 2016/0245151 A1 | | 8/2016 | Yuuki et al. | |
| 2017/0218913 A1 | | 8/2017 | Kanehara et al. | |

FOREIGN PATENT DOCUMENTS

| | | |
|---|---|---|
| JP | 59-105922 A | 6/1984 |
| JP | 10-47064 A | 2/1998 |
| JP | 2003-97271 A | 4/2003 |
| JP | 2007-255313 A | 10/2007 |
| JP | 2009-197704 A | 9/2009 |
| JP | 2016-33342 A | 3/2016 |
| WO | WO 2015/060236 A1 | 4/2015 |

OTHER PUBLICATIONS

International Search Report (Form PCT/ISA/210) for International Application No. PCT/JP2016/086664, dated Mar. 14, 2017.
Extended European Search Report dated Jul. 11, 2018 issued in corresponding EP Application No. 16878408.0.
First Office Action dated Feb. 22, 2019 issued in the corresponding European Application No. 16 878 408.0.

* cited by examiner

PRECOMBUSTION-CHAMBER ENGINE

TECHNICAL FIELD

The present disclosure relates to a precombustion-chamber engine.

BACKGROUND ART

A precombustion-chamber gas engine is used as one of engines for electricity generation or the like. The precombustion-chamber gas engine includes a main combustion chamber defined between a piston, a liner, and a cylinder head and a precombustion chamber communicating with the main combustion chamber through a nozzle to allow the following combustion workflow.

Firstly, ignition fuel gas (fuel gas or rich mixed gas) is supplied to the precombustion chamber from a supply line for ignition fuel gas. Secondly, in a compression stroke, lean air-fuel premixture in the main combustion chamber flows into the precombustion chamber through a nozzle, and the lean premixed gas is mixed with the ignition fuel gas in the precombustion chamber so that a stoichiometric mixture ratio (stoich) is achieved immediately before ignition. Then, a spark plug sparks in the precombustion chamber, and flame propagation combustion occurs in the precombustion chamber. Combustion gas generated in the precombustion chamber is injected as a torch into the main combustion chamber through the nozzle to combust the mixed gas in the main combustion chamber by torch combustion and flame propagation combustion.

The above-described precombustion-chamber engine allows the lean premixed gas in the main combustion chamber to combust at a relatively low temperature and thereby reduces the generation of $NO_X$ or the like, resulting in low pollution. Further, even when the main combustion chamber contains the lean premixed gas, combustion can be quickly completed in the main combustion chamber because of the injected torch with enough energy.

Besides, the mixture state of the ignition fuel gas and the lean premixed gas in the precombustion chamber is significantly affected by combustion fluctuation (i.e. change of combustion state in each cylinder among combustion cycles) in the main combustion chamber. A reduction in combustion fluctuation contributes to improvement of engine efficiency, and thus, engine efficiency can be improved by facilitating mixing of the ignition fuel gas with the lean premixed gas in the precombustion chamber to homogenize the air-fuel mixture in the precombustion chamber.

Patent Document 1 discloses a precombustion-chamber engine which aims at suppressing the occurrence of abnormal combustion such as pre-ignition. This precombustion-chamber gas engine includes a precombustion chamber composed of a precombustion-chamber space part provided with an ignition plug and a precombustion-chamber communication passage provided with a nozzle, in which the precombustion-chamber space part is eccentrically disposed with respect to the central axis of the precombustion-chamber communication passage. This structure causes a regular gas flow in the precombustion chamber to homogenize the air-fuel mixture, thereby suppressing the occurrence of abnormal combustion.

CITATION LIST

Patent Literature

Patent Document 1: JP2007-255313A

SUMMARY

Problems to be Solved

In the precombustion-chamber engine disclosed in Patent Document 1, the precombustion chamber includes a precombustion-chamber communication passage extending upwardly from a nozzle, an enlarged-diameter part extending upwardly from the precombustion-chamber communication passage with increasing its diameter, and a space part provided with an ignition plug and connected with the upper end of the enlarged-diameter part. In this precombustion-chamber engine, the precombustion-chamber communication passage and the enlarged-diameter part are each axisymmetric, while only the center of the space part is eccentric with respect to the central axis of the precombustion-chamber communication passage.

The present inventors, however, repeatedly and keenly conducted studies and consequently found that the precombustion-chamber engine which includes the precombustion chamber with an axisymmetric enlarged-diameter part as in Patent Document 1 cannot easily cause a regular gas flow in the precombustion chamber and limits the effect of facilitating mixing in the precombustion chamber.

In view of the above circumstances, an object of at least one embodiment of the present invention is to provide a precombustion-chamber engine capable of facilitating mixing of lean premixed gas which enters from a main combustion chamber through a nozzle with ignition fuel gas which enters from an ignition-fuel-gas supply channel, in a precombustion chamber.

Solution to the Problems (1) A precombustion-chamber engine according to at least one embodiment of the present invention comprises a cylinder; a cylinder head disposed on a top of the cylinder; and a piston reciprocably disposed within the cylinder, the piston and the cylinder head defining a main combustion chamber therebetween, the cylinder head including a precombustion-chamber forming part which defines a precombustion chamber communicating with the main combustion chamber through a nozzle, the precombustion chamber including: a cylindrical first passage part extending upwardly from the nozzle; a second passage part extending upwardly from the first passage part and having an upwardly-increasing cross-sectional area; and a cylindrical space part which extends upwardly from the second passage part and in which a spark plug is disposed, wherein a center (centroid) O is eccentric with respect to a straight line L, where the straight line L is an extended line of the axis of the first passage part, and the center O is a center of a cross-section, orthogonal to the straight line L, of the second passage part.

With the precombustion-chamber engine described in the above (1), the center O of the cross-section of the second passage part is eccentric with respect to the straight line L; thus, lean premixed gas which enters from the main combustion chamber through the nozzle into the first passage part moves upwardly through the first passage part; then moves upwardly along a surface, on an opposite side to the eccentric direction of the center O with respect to the straight line L, of the second-passage-part forming surface which defines the second passage part; flows along a top surface of the space part in the eccentric direction; and moves downwardly along a surface, on the eccentric direction side with respect to the straight line L, of the second-passage-part forming surface. That is, a flow direction of the lean premixed gas which enters the precombustion chamber from the nozzle can be stabilized.

Thus, it is possible to facilitate mixing of the lean premixed gas which enters from the main combustion chamber through the nozzle with the ignition fuel gas which enters from the ignition-fuel-gas supply channel, in the precombustion chamber, and thereby an improved mixture state is achieved. As a result, it is possible to stably obtain a torch from the nozzle and thus reduce combustion fluctuation in the main chamber.

(2) In some embodiments, in the precombustion-chamber engine described in the above (1), a second-passage-part forming surface which defines the second passage part is smoothly connected with a first-passage-part forming surface which defines the first passage part and with a space-part forming surface which defines the space part.

With the precombustion-chamber engine described in the above (2), it is possible to prevent an unburnt region (to be afterburned) remaining, at a junction between the second-passage-part forming surface and the first-passage-part forming surface as well as a junction between the second-passage-part forming surface and the first-passage-part forming surface, in the precombustion chamber, thus enabling efficient combustion in the precombustion chamber.

(3) In some embodiments, in the precombustion-chamber engine described in the above (1) or (2), provided that a direction A is a direction in which the center O of the cross-section is eccentric with respect to the straight line L, a cross-section S is a cross-section of the precombustion chamber, including the straight line L and the direction A, a first line is a part of a second-passage-part forming surface which defines the second passage part on a direction A side across the straight line L in the cross-section S, a second line is a part of the second-passage-part forming surface on an opposite side to the direction A across the straight line L in the cross-section S, θ1 is an angle between the straight line L and a straight line connecting an upper end and a lower end of the first line, and θ2 is an angle between the straight line L and a straight line connecting an upper end and a lower end of the second line, the second-passage-part forming surface is configured to satisfy θ1>θ2.

With the precombustion-chamber engine described in the above (3) where θ1>θ2 is satisfied, the lean premixed gas can flow smoothly in the precombustion chamber, in accordance with the flow described in the above (1). Thus, it is possible to efficiently facilitate mixing of the lean premixed gas which enters from the nozzle with the ignition fuel gas which enters from the ignition-fuel-gas supply channel.

(4) In some embodiments, in the precombustion-chamber engine described in the above (3), the second-passage-part forming surface is configured to satisfy 30°<θ1<45°.

With the precombustion-chamber engine described in the above (4), the lean premixed gas can flow more smoothly in the precombustion chamber, in accordance with the flow described in the above (1), resulting in an improved mixture state.

(5) In some embodiments, in the precombustion-chamber engine described in the above (3) or (4), the first line extends upwardly with increasing a distance from the straight line L, and the second line includes: an extended line part extending, from a first-passage wall surface which defines the first passage part, in a direction of extending the first-passage wall surface; and a tapered line part connecting the extended line part with a space wall surface which defines the space part and extending upwardly with increasing a distance from the straight line L.

With the precombustion-chamber engine described in the above (5), the gas which flows downwardly along the first line as described in the above (1) is easily introduced under a junction of the extended line part and the tapered line part. This enables the lean premixed gas to flow more smoothly in the precombustion chamber, resulting in an improved mixture state.

(6) In some embodiments, the precombustion-chamber engine described in any one of the above (1) to (5), further comprises an ignition-fuel-gas supply channel for supplying an ignition fuel gas to the precombustion chamber, wherein the second passage part is symmetric across the cross-section S, and wherein the ignition-fuel-gas supply channel has a supply port disposed on a space-part forming surface which defines the space part, the supply port being situated away from the cross-section S.

With the precombustion-chamber engine described in the above (6), the supply port is situated away from the cross-section S, which is the center of symmetry of the second passage part. Thus, a flow direction of the ignition fuel gas supplied from the supply port can be easily stabilized in the precombustion chamber, which makes it possible to facilitate mixing of the ignition fuel gas with the lean premixed gas which enters through the nozzle.

(7) In some embodiments, the precombustion-chamber engine described in any one of the above (1) to (6), further comprises an ignition-fuel-gas supply channel for supplying an ignition fuel gas to the precombustion chamber, wherein the ignition-fuel-gas supply channel has a supply port disposed on a space-part forming surface which defines the space part, the supply port being situated on an opposite side to the direction A across a center P of a cross-section, orthogonal to the straight line L, of the space part, and wherein the ignition-fuel-gas supply channel is configured to inject the ignition fuel gas through the supply port toward a direction A side.

With the precombustion-chamber engine described in the above (7), the ignition-fuel-gas supply channel injects the ignition fuel gas, through the supply port, to a relatively large space on the direction A side (i.e. the eccentric direction side of the second passage part). Thus, it is possible to facilitate mixing of the ignition fuel gas supplied from the supply port with the lean premixed gas which enters through the nozzle.

Advantageous Effects

According to at least one embodiment of the present invention, there is provided a precombustion-chamber engine capable of facilitating mixing of lean premixed gas which enters from the main combustion chamber through the nozzle with ignition fuel gas which enters from the ignition-fuel-gas supply channel, in the precombustion chamber.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

On the other hand, an expression such as "comprise", "include", "have", "contain" and "constitute" are not intended to be exclusive of other components.

Figure 1:
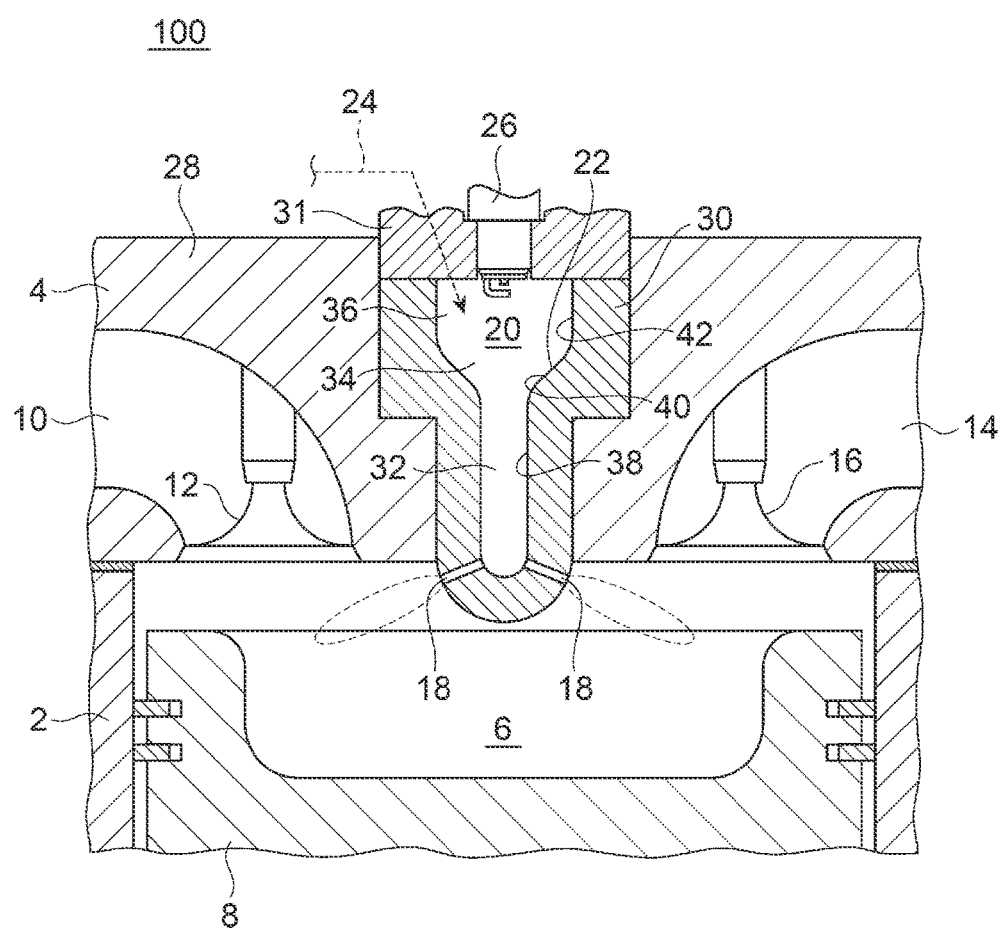
FIG. 1 is a schematic view showing a schematic configuration of a precombustion-chamber gas engine according to an embodiment of the present invention.

FIG. 1 is a schematic view showing a schematic configuration of a precombustion-chamber gas engine according to an embodiment of the present invention.

The precombustion-chamber gas engine 100 includes a cylinder (liner) 2, a cylinder head 4 disposed on a top of the cylinder 2, a piston 8 reciprocably disposed within the cylinder 2, in which a main combustion chamber (main chamber) 6 is defined between the piston 8 and the cylinder head 4. The precombustion-chamber gas engine 100 also includes an intake valve 12 for opening or closing an intake port 10 disposed at the cylinder head 4, and an exhaust valve 16 for opening or closing an exhaust port 14 disposed at the cylinder head 4.

A precombustion chamber 20 communicating with the main combustion chamber 6 through nozzles 18 is formed inside the cylinder head 4. Further, the precombustion-chamber gas engine 100 includes an ignition-fuel-gas supply channel 24 for supplying ignition fuel gas to the precombustion chamber 20 without interposing the main combustion chamber 6 and an ignition plug 26 for igniting air-fuel mixture containing the ignition fuel gas introduced into the precombustion chamber 20.

The cylinder head 4 includes a cylinder head body 28, a cylindrical precombustion-chamber cap 30 accommodated in the cylinder head body 28 with the nozzles 18 formed on the bottom, and a plug holder 31 holding the ignition plug 26. In the illustrated exemplary embodiment, the precombustion chamber 20 is defined by an inner peripheral surface of the precombustion-chamber cap 30, a lower surface of the ignition plug 26, and a lower surface of the plug holder 31. That is, the precombustion-chamber cap 30, the ignition plug 26, and the plug holder 31 constitute a precombustion-chamber forming part 22 which defines the precombustion chamber 20. The ignition-fuel-gas supply channel 24 is formed inside the plug holder 31.

Combustion gas generated in the precombustion chamber 20 is, as shown by dotted lines in the vicinity of the nozzles 18 in FIG. 1, injected as a torch through the nozzles 18 of the precombustion chamber 20 to combust the mixed gas in the main combustion chamber 6. This makes it possible to combust the lean mixed gas in the main combustion chamber 6, thus enabling low fuel consumption. Further, since the combustion of the lean mixed gas in the main combustion chamber 6 is performed at a relatively low temperature, the generation of $NO_X$ or the like is reduced, and low pollution is achieved.

Figure 2:
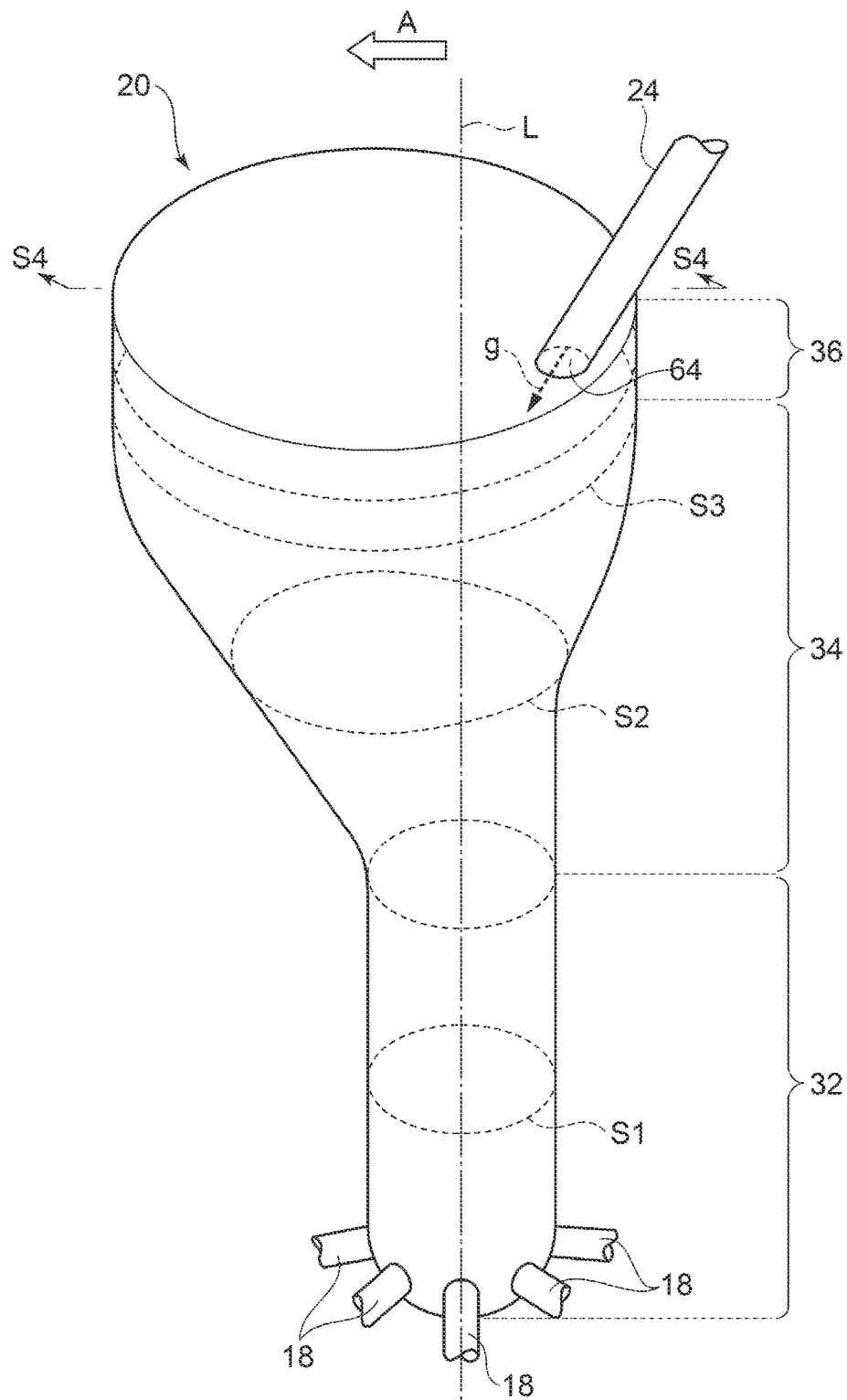
FIG. 2 is a perspective view showing a schematic shape of a precombustion chamber 20 according to an embodiment.

FIG. 2 is a perspective view showing a schematic shape of the precombustion chamber 20 according to an embodiment. As shown in FIG. 2, the precombustion chamber 20 includes a first passage part 32 (throat part), a second passage part 34, and a space part 36.

The first passage part 32 is a cylindrical passage part extending upwardly from the nozzles 18. The cross-sectional area of the first passage part 32 (i.e. surface area of a cross-section S1 orthogonal to a straight line L composed of an axis of the first passage part 32 and an extended line thereof) is constant regardless of the height-directional position.

The second passage part 34 extends upwardly from the first passage part 32 and has an upwardly-increasing cross-sectional area (i.e. surface area of a cross-section S2 orthogonal to the straight line L).

The space part 36 is a cylindrical space part which extends upwardly from the second passage part 34 and in which the ignition plug 26 (see FIG. 1) is disposed. The cross-sectional area of the space part 36 (i.e. surface area of a cross-section S3 orthogonal to the straight line L) is constant regardless of the height-directional position.

In an embodiment, for instance as shown in FIG. 1, a second-passage-part forming surface 40 which defines the second passage part 34 is smoothly (without angled corners) connected with a first-passage-part forming surface 38 which defines the first passage part 32 and with a space-part forming surface 42 which defines the space part 36. This prevents an unburnt region (to be afterburned) from remaining in the precombustion chamber 20 and enables efficient combustion in the precombustion chamber 20. In the illustrated exemplary embodiment, the first-passage-part forming surface 38 and the second-passage-part forming surface 40 each form a part of the inner peripheral surface of the precombustion-chamber cap 30. Additionally, the space-part forming surface 42 is composed of a part of the inner peripheral surface of the precombustion-chamber cap 30, a lower surface of the plug holder 31, and a lower surface of the ignition plug 26.

Figure 3:
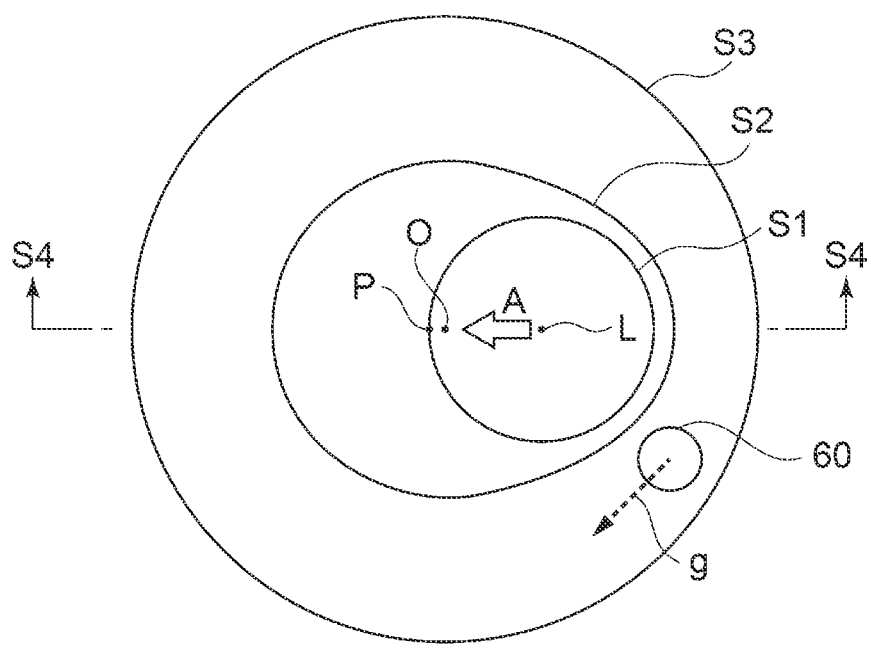
FIG. 3 is a plan view showing an example of the shape and the arrangement of a cross-section S1 of a first passage part 32, a cross-section S2 of a second passage part 34, and a cross-section S3 of a space part 36 along a straight line L.
Figure 4:
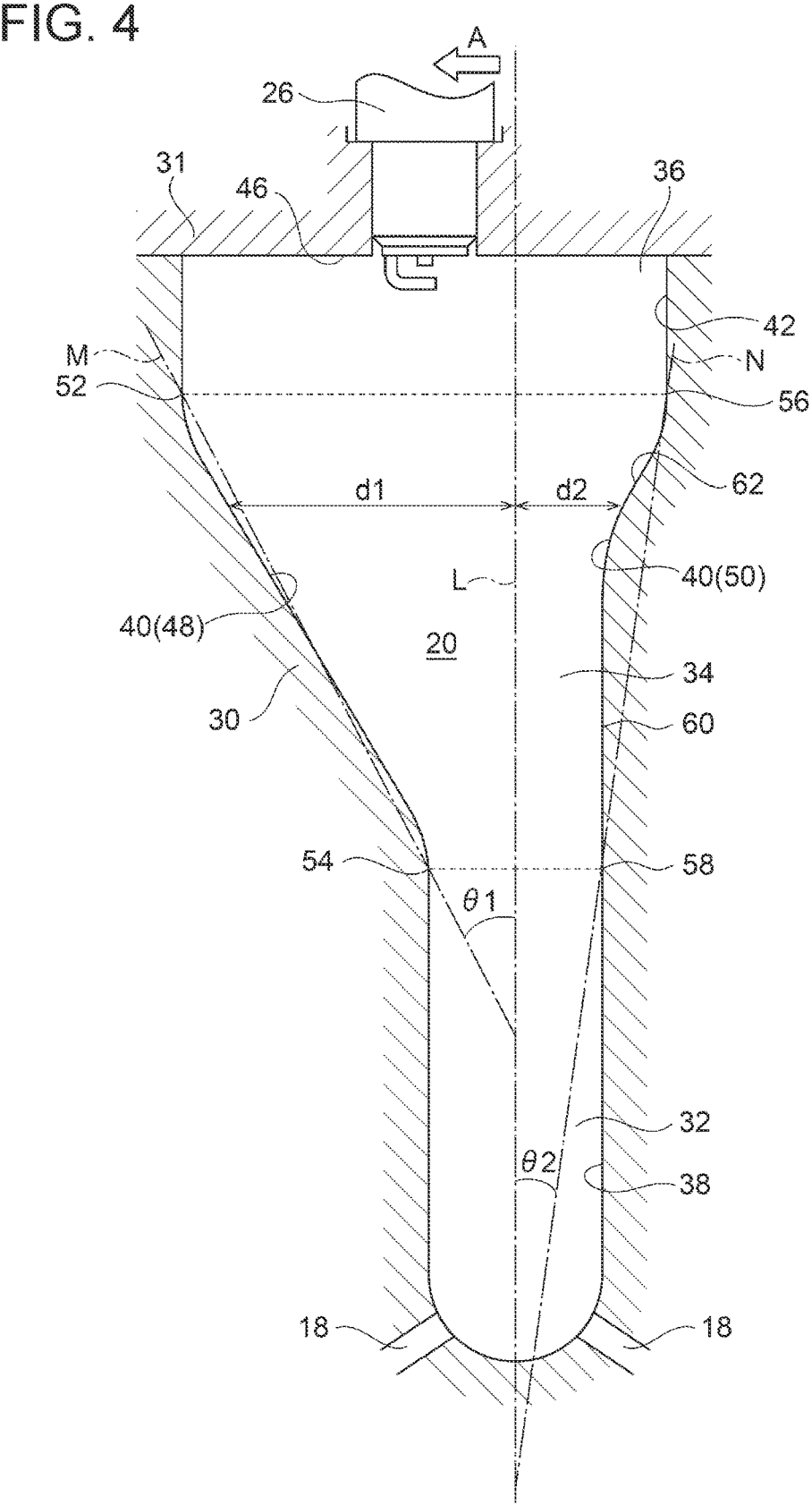
FIG. 4 is a diagram showing an example of a cross-section S4 of the precombustion chamber 20 in FIG. 2 and FIG. 3.
Figure 5:
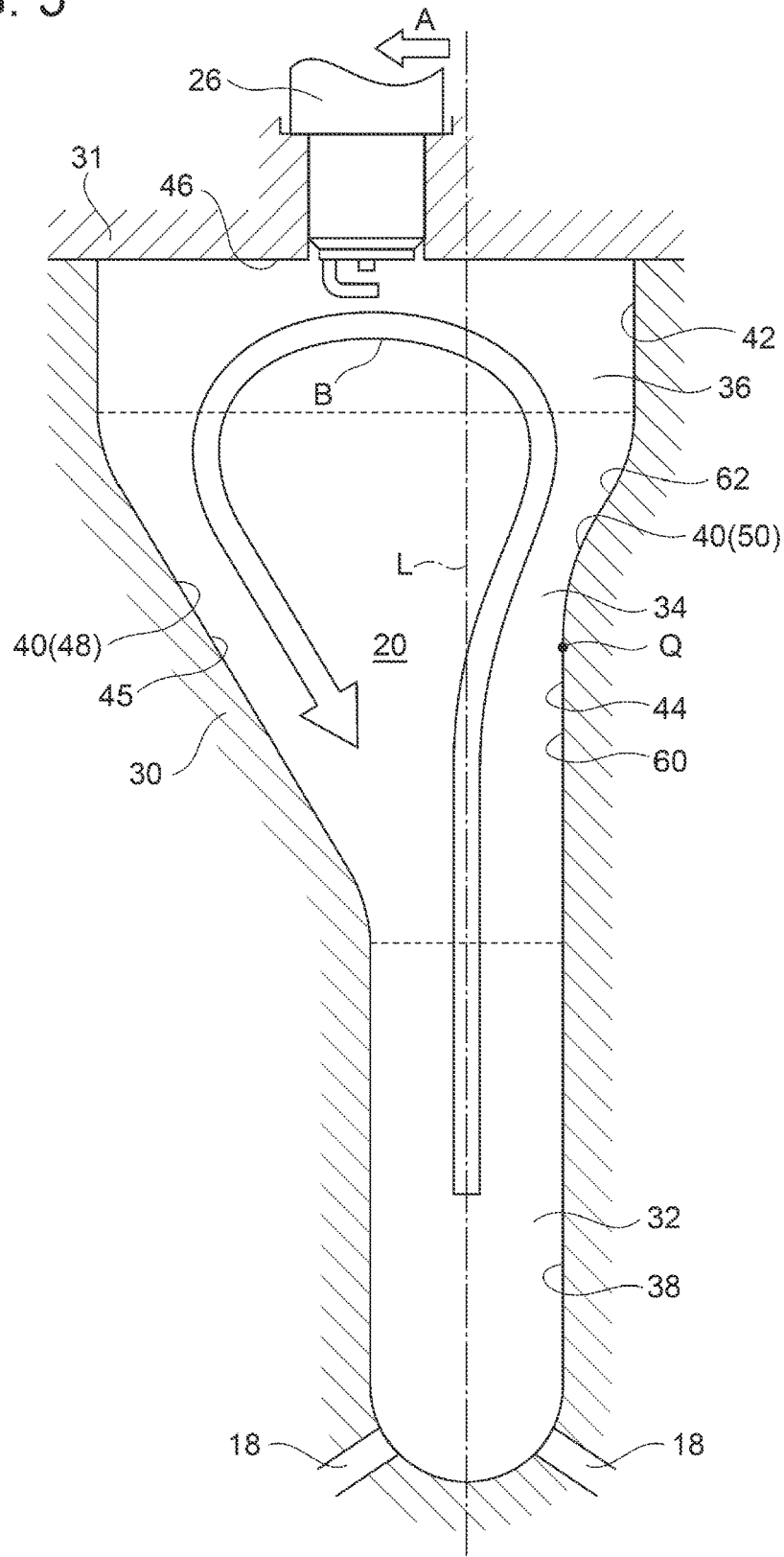
FIG. 5 is a diagram showing an example of a cross-section S4 of the precombustion chamber 20 in FIG. 2 and FIG. 3.

FIG. 3 is a diagram showing an example of the shape and the arrangement of a cross-section S1 orthogonal to the straight line L in the first passage part 32, a cross-section S2 orthogonal to the straight line L in the second passage part 34, and a cross-section S3 orthogonal to the straight line L in the space part 36, in the precombustion chamber 20 shown in FIG. 2. FIGS. 4 and 5 are diagrams showing an example of a cross-section S4 of the precombustion chamber 20 in FIGS. 2 and 3. The cross-section S4 is a cross-section including the straight line L and a later-described direction A (i.e. a cross-section including the straight line L and a straight line intersecting with the straight line L and parallel to the direction A) in the precombustion chamber 20.

As shown in FIG. 3, the center O (centroid) of the cross-section S2 of the second passage part 34 is eccentric with respect to the straight line L. Additionally, as shown in FIG. 3, the center P (centroid) of the cross-section S3, orthogonal to the straight line L, of the space part 36 is eccentric with respect to the straight line L in the direction A in which the center O of the cross-section S2 of the second passage part 34 is eccentric with respect to the straight line L.

With this configuration, the center O of the cross-section S2 of the second passage part 34 is eccentric with respect to the straight line L; thus, as shown by the arrow B in FIG. 5, lean premixed gas which enters from the main combustion chamber 6 through the nozzles 18 into the first passage part 32 moves upwardly through the first passage part 32; then moves upwardly along a surface 44, on an opposite side to the direction A across the straight line L, of the second-passage-part forming surface 40; flows along a top surface 46 of the space-part forming surface 42 toward the direction A side; and moves downwardly along a surface 45, on the direction A side across the straight line L, of the second-passage-part forming surface 40. That is, a flow direction of the lean premixed gas which enters the precombustion chamber 20 from the nozzles 18 can be stabilized in a direction shown by the arrow B.

Thus, it is possible to facilitate mixing of the lean premixed gas which enters from the main combustion chamber 6 through the nozzles 18 with the ignition fuel gas which enters from the ignition-fuel-gas supply channel 24, in the precombustion chamber 20, and thereby an improved mixture state is stably achieved. As a result, it is possible to stably obtain a torch from the nozzles 18 and thus reduce combustion fluctuation in the main chamber 6.

In an embodiment, for instance as shown in FIG. 4, the second-passage-part forming surface 40 is configured to satisfy θ1>θ2, where θ1 is an angle between the straight line L and a straight line M passing through an upper end 52 of a first line 48 and a lower end 54 of the first line 48; θ2 is an angle between the straight line L and a straight line N passing through an upper end 56 of a second line 50 and a lower end 58 of the second line 50, where the first line 48 is a part of the second-passage-part forming surface 40, on the direction A side across the straight line L, in the cross-section S4; the second line 50 is a part of the second-passage-part forming surface 40, on the opposite side to the direction A across the straight line L, in the cross-section S4.

When θ1>θ2 is satisfied, the lean premixed gas can flow smoothly in the precombustion chamber 20 in accordance with the arrow B in FIG. 5. Thus, it is possible to efficiently facilitate mixing of the lean premixed gas which enters from the nozzles 18 with the ignition fuel gas which enters from the ignition-fuel-gas supply channel 24.

In an embodiment, the second-passage-part forming surface 40 is configured to satisfy 30°<θ1<45°. This enables the lean premixed gas to flow more smoothly in accordance with the arrow B in FIG. 5, resulting in an improved mixture state.

In an embodiment, as shown in FIG. 4, in the cross-section S4, the first line 48 extends upwardly with increasing a distance d1 from the straight line L. Additionally, in the cross-section S4, the second line 50 includes an extended line part 60 extending from the first-passage-part forming surface 38 in a direction of extending the first-passage-part forming surface 38 (i.e. a direction parallel to the straight line L) and a tapered line part 62 connecting the extended line part 60 and the space-part forming surface 42 and extending upwardly with increasing a distance d2 from the straight line L.

This makes it easy that the gas which flows downwardly along the first line 48 is introduced under a junction Q of the extended line part 60 and the tapered line part 62, as shown by the arrow B in FIG. 5. This enables the lean premixed gas to flow more smoothly in accordance with the arrow B in FIG. 5, resulting in an improved mixture state.

In an embodiment, in FIG. 2, the second passage part 34 is symmetric across the cross-section S4. Additionally, as shown in FIGS. 2 and 3, a supply port 64 of the ignition-fuel-gas supply channel 24 is situated away from the cross-section S4.

With this configuration, the supply port 64 is situated away from the cross-section S4, which is the center of symmetry of the second passage part 34. Thus, a flow direction of the ignition fuel gas g supplied from the supply port 64 can be easily stabilized in the precombustion chamber 20, which makes it possible to facilitate mixing of the ignition fuel gas with the lean premixed gas which enters through the nozzles 18.

In an embodiment, as shown in at least one of FIGS. 2 and 3, the supply port 64 disposed on the top surface 46 of the space-part forming surface 42 is situated on the opposite side to the direction A across the straight line L. Additionally, the ignition-fuel-gas supply channel 24 is configured to inject the ignition fuel gas g, through the supply port 64, obliquely downward on the direction A side.

With this configuration, the ignition-fuel-gas supply channel 24 injects the ignition fuel gas g, through the supply port 64, to a relatively large space on the direction A side (i.e. the eccentric direction side of the second passage part 34). Thus, it is possible to facilitate mixing of the ignition fuel gas g supplied through the supply port 64 with the lean premixed gas which enters through the nozzles 18.

Figure 8:
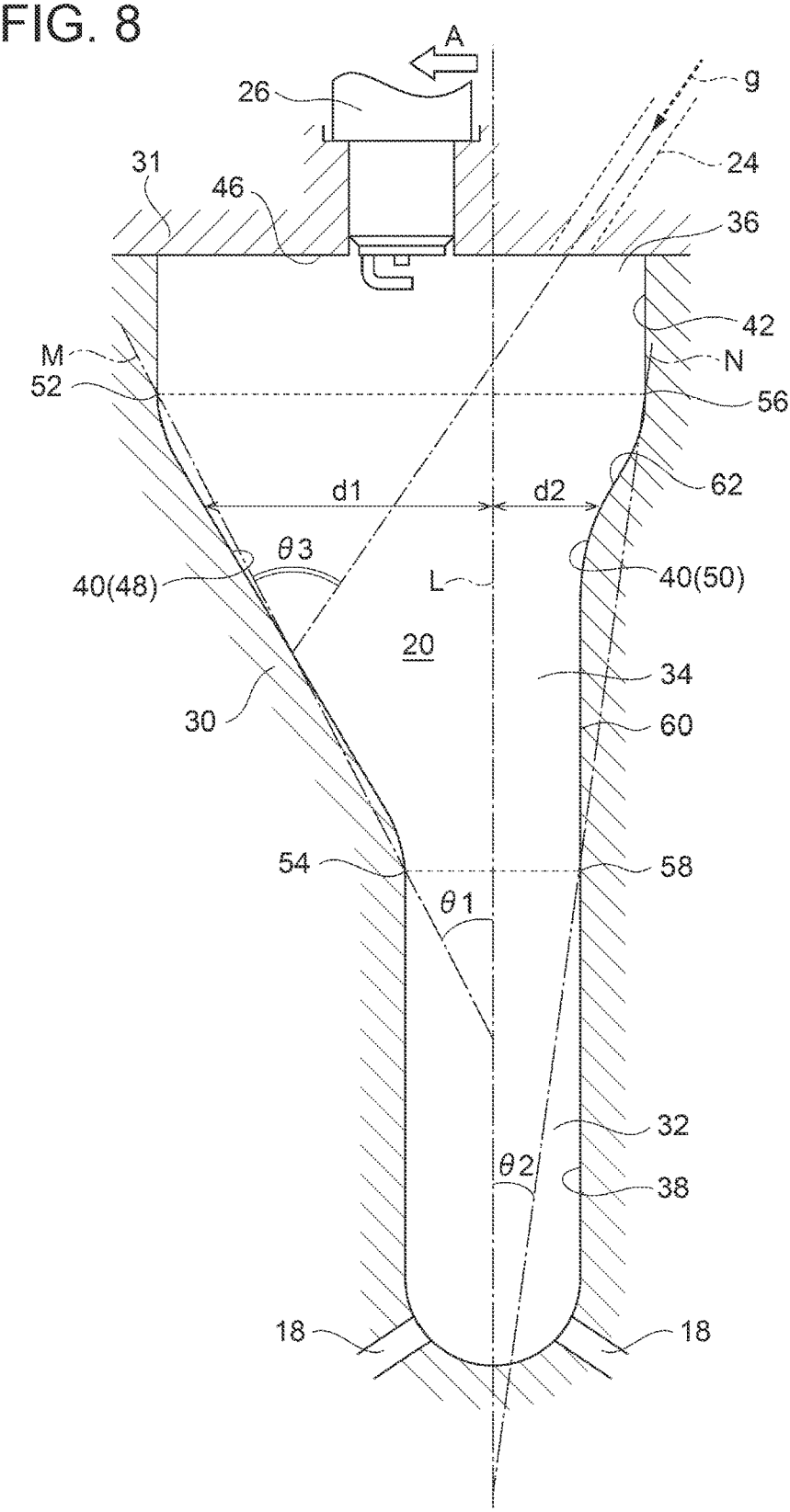
FIG. 8 is a diagram showing, in case where ignition fuel gas g is injected toward the direction A side, an angle θ3 between a straight line M and a direction of injecting the ignition fuel gas g, viewing from a direction orthogonal to a cross-section S4.
Figure 9:
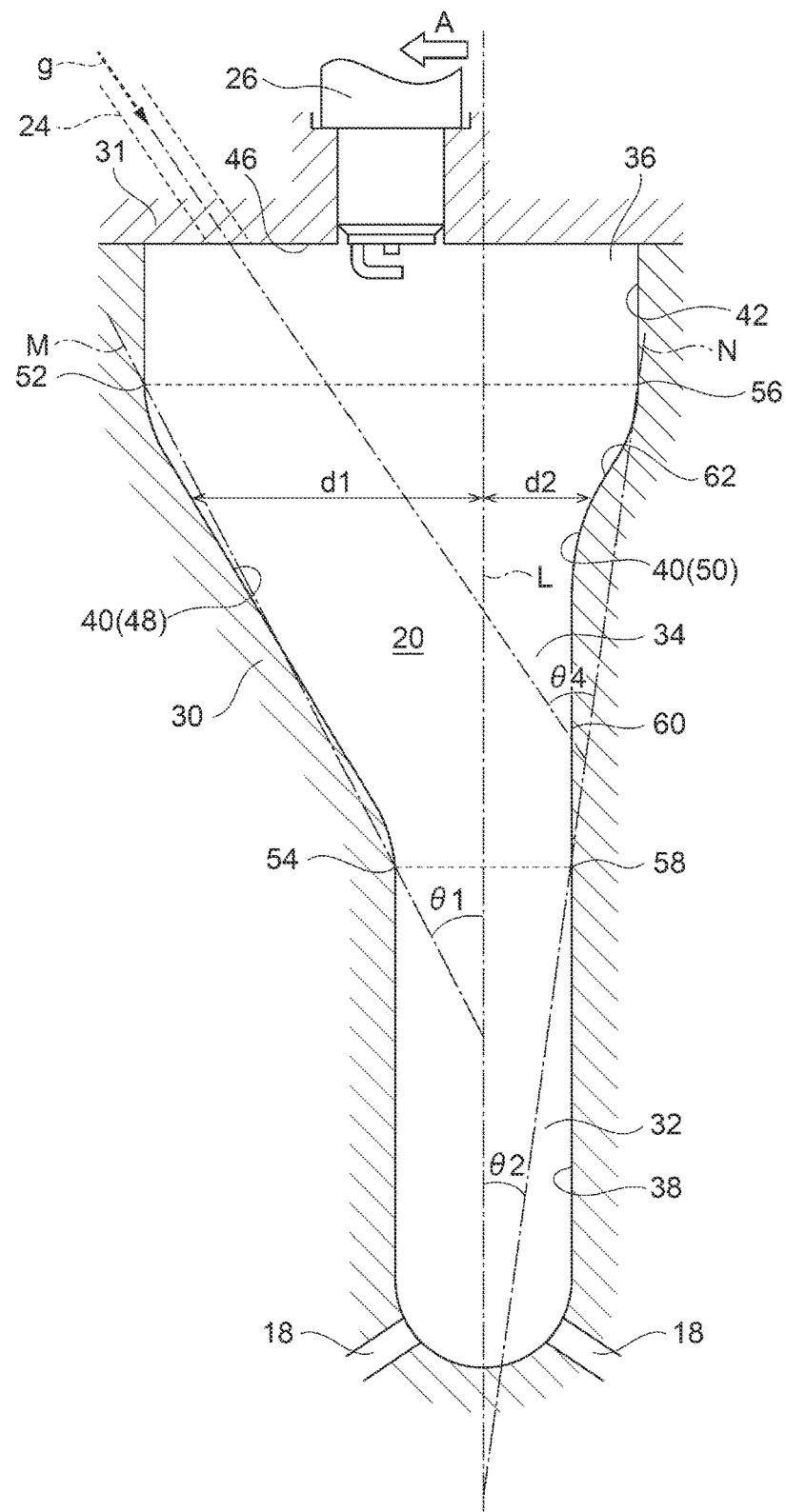
FIG. 9 is a diagram showing, in case where ignition fuel gas g is injected opposite to the direction A side, an angle θ4 between a straight line M and a direction of injecting the ignition fuel gas g, viewing from a direction orthogonal to a cross-section S4.

Additionally, since the ignition-fuel-gas supply channel 24 injects the ignition fuel gas g, through the supply port 64, to a relatively large space on the direction A side (i.e. the eccentric direction side of the second passage part 34) when viewing from a direction orthogonal to the cross-section S4, an angle θ3 (see FIG. 8) between the straight line M and a direction in which the ignition fuel gas g is injected (i.e. a direction in which the axis of the ignition-fuel-gas supply channel 24 extends from the support port 64) is made larger than an angle θ4 (see FIG. 9) between the straight line N and a direction in which the ignition fuel gas g would be injected if the ignition fuel gas g was injected opposite to the direction A side. Thus, a flow of the ignition fuel gas g supplied toward the nozzles 18 is reduced compared with the case shown in FIG. 9, and thereby the amount of the ignition fuel gas g held in the precombustion chamber 20 is increased. Therefore, it is possible to ensure a necessary amount of the ignition fuel gas g in the precombustion chamber 20, with a low supply amount of the ignition fuel gas g.

Embodiments of the present invention were described in detail above, but the present invention is not limited thereto, and various amendments and modifications may be implemented.

For instance, the embodiments depicted in FIGS. 4 and 5 showed the case where the second line 50 includes, in the cross-section S4, the extended line part 60 extending from the first-passage-part forming surface 38 in a direction of extending the first-passage-part forming surface 38 (i.e. a direction parallel to the straight line L) and a tapered line part 62 connecting the extended line part 60 with the space-part forming surface 42 and extending upwardly with increasing the distance d2 from the straight line L.

Figure 6:
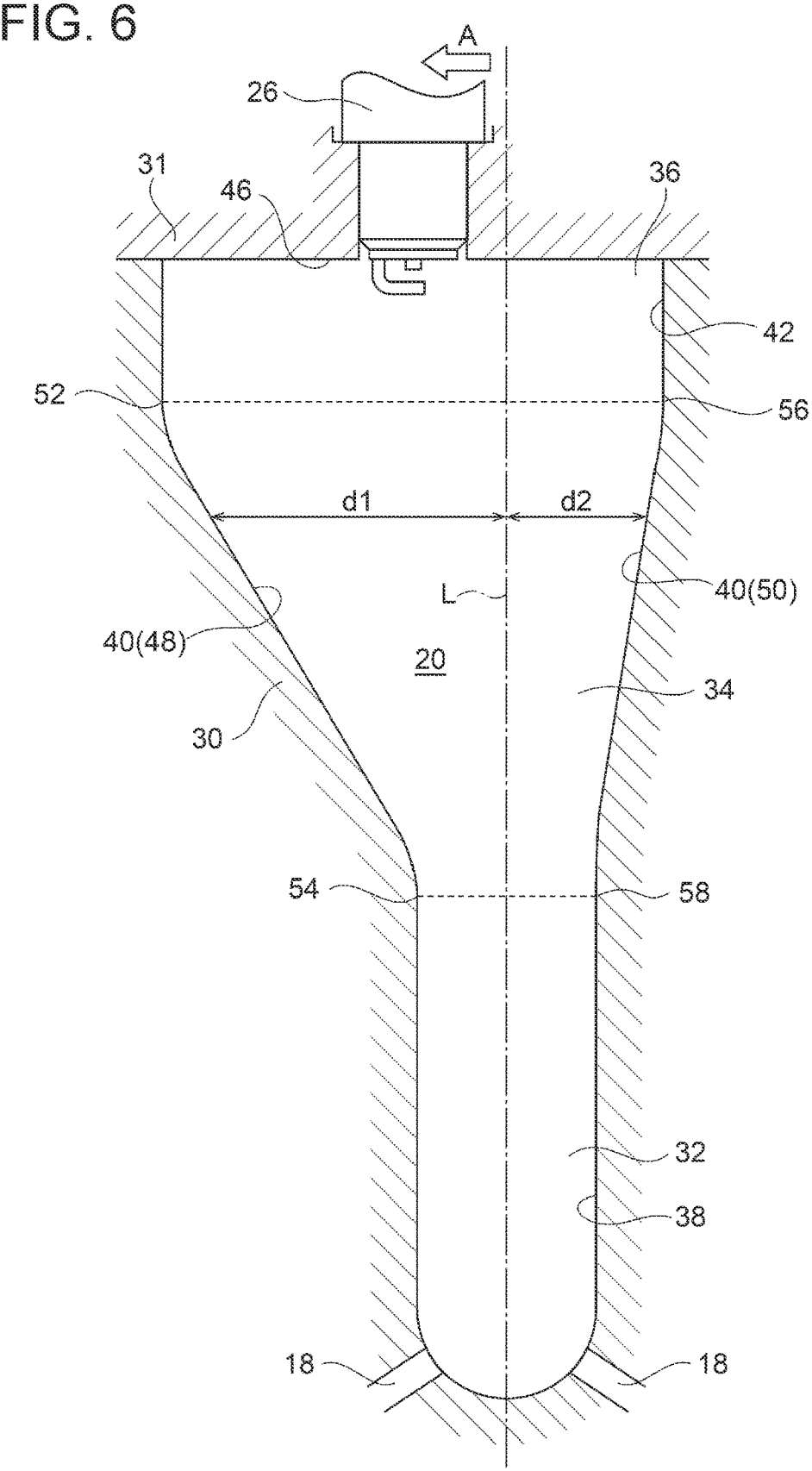
FIG. 6 is a diagram showing another example of a cross-section S4 of the precombustion chamber 20.
Figure 7:
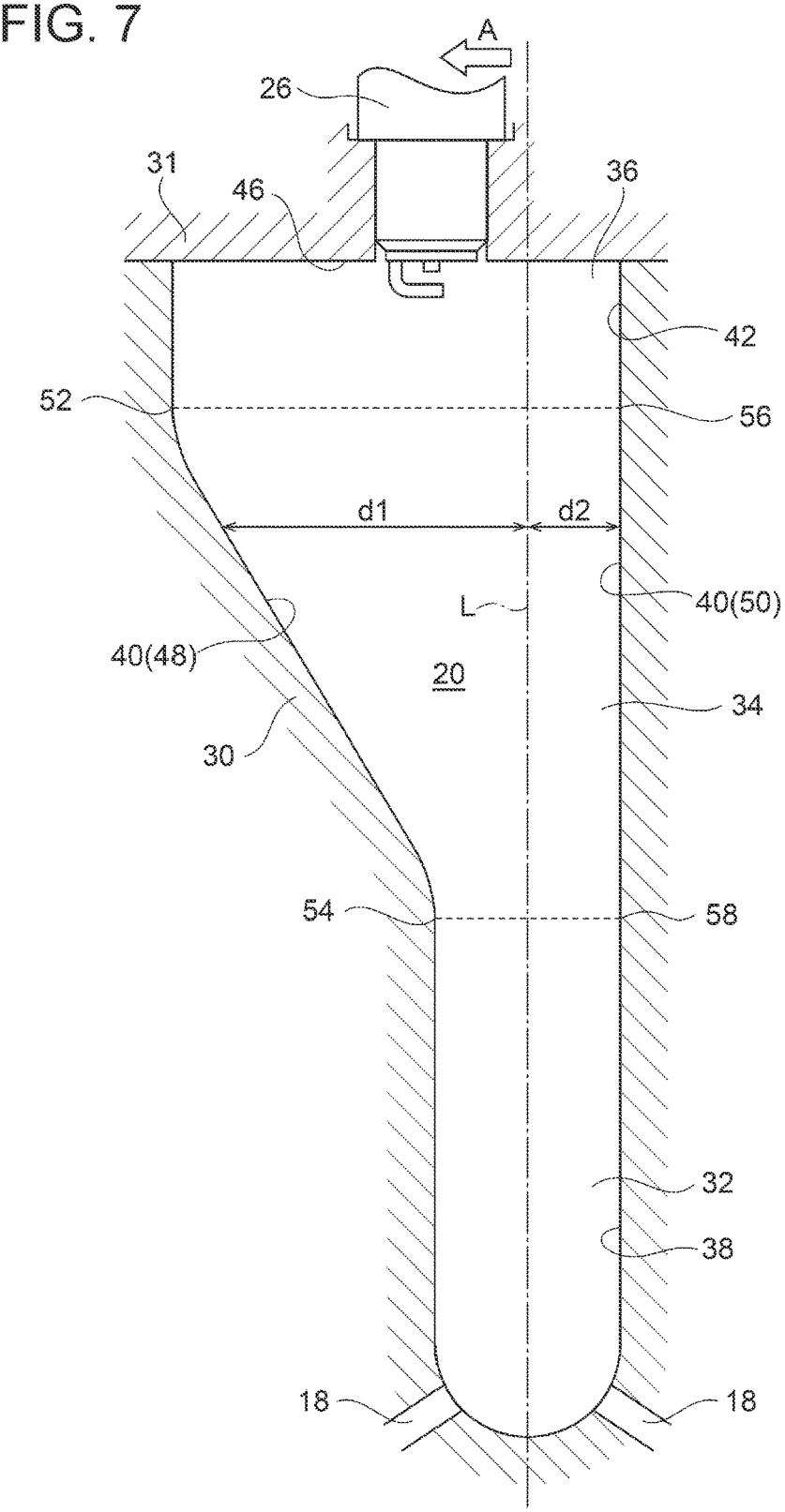
FIG. 7 is a diagram showing another example of a cross-section S4 of the precombustion chamber 20.

However, the present invention is not limited to this embodiment. The second line 50 may be wholly inclined in the cross-section S4 so that the distance d2 from the straight line L upwardly increases, for instance as shown in FIG. 6. Alternatively, the second line 50 may be a straight line parallel to the straight line L in the cross-section S4, for instance as shown in FIG. 7.

REFERENCE SIGNS LIST

2 Cylinder
4 Cylinder head
6 Main combustion chamber
8 Piston
10 Intake port
12 Intake valve
14 Exhaust port
16 Exhaust valve
18 Nozzle
20 Precombustion chamber
22 Precombustion-chamber-forming part
24 Ignition-fuel-gas supply channel
26 Ignition plug
28 Cylinder head body
30 Precombustion-chamber cap
31 Plug holder
32 First passage part
34 Second passage part
36 Space part
38 First-passage-part forming surface
40 Second-passage-part forming surface
42 Space-part forming surface
44 Surface
45 Surface
46 Top surface
48 First line
50 Second line
52 Upper end
54 Lower end
56 Upper end
58 Lower end
60 Extended line part
62 Tapered line part
64 Supply port
100 Precombustion-chamber gas engine

The invention claimed is:
1. A precombustion-chamber engine, comprising:
a cylinder;
a cylinder head disposed on a top of the cylinder; and
a piston reciprocably disposed within the cylinder, the piston and the cylinder head defining a main combustion chamber therebetween,
the cylinder head including a precombustion-chamber forming part which defines a precombustion chamber communicating with the main combustion chamber through a nozzle,
the precombustion chamber including:
a cylindrical first passage part extending upwardly from the nozzle;
a second passage part extending upwardly from the first passage part and having an upwardly-increasing cross-sectional area; and
a cylindrical space part which extends upwardly from the second passage part and in which a spark plug is disposed,
wherein a center O is eccentric with respect to a straight line L, where the straight line L, is composed of an axis of the first passage part and an extended line of the axis, and the center O is a center of a cross-section, orthogonal to the straight line L, of the second passage part,
wherein, the precombustion-chamber engine further comprises an ignition-fuel-gas supply channel for supplying an ignition fuel gas to the precombustion-chamber,
wherein, provided that
a direction A is a direction in which the center O of the cross-section is eccentric with respect to the straight line L, and
a cross-section S is a cross-section of the precombustion chamber, including the straight line L and the direction A,
the second passage part is symmetric across the cross-section S, and
wherein the ignition-fuel-gas supply channel has a supply port disposed on a space-part forming surface which defines the space part, the supply port being situated away from the cross-section S.

2. The precombustion-chamber engine according to claim 1,
wherein a second-passage-part forming surface which defines the second passage part is smoothly connected with a first-passage-part forming surface which defines the first passage part and with a space-part forming surface which defines the space part.

3. The precombustion-chamber engine according to claim 1,
wherein, provided that
a first line is a part of a second-passage-part forming surface which defines the second passage part on a direction A side across the straight line L in the cross-section S,
a second line is a part of the second-passage-part forming surface on an opposite side to the direction A across the straight line L in the cross-section S,
θ1 is an angle between the straight line L and a straight line connecting an upper end and a lower end of the first line, and
θ2 is an angle between the straight line L and a straight line connecting an upper end and a lower end of the second line,
the second-passage-part forming surface is configured to satisfy θ1>θ2.

4. The precombustion-chamber engine according to claim 3,
wherein the second-passage-part-forming surface is configured to satisfy 30°≤θ1≤45°.

5. The precombustion-chamber engine according to claim 3,
wherein the first line extends upwardly with increasing a distance from the straight line L, and
wherein the second line includes: an extended line part extending, from a first-passage wall surface which defines the first passage part, in a direction of extending the first-passage wall surface; and a tapered line part connecting the extended line part with a space wall surface which defines the space part and extending upwardly with increasing a distance from the straight line L.

6. The precombustion-chamber engine according to claim 1, further comprising an ignition-fuel-gas supply channel for supplying an ignition fuel gas to the precombustion chamber,
   wherein the ignition-fuel-gas supply channel has a supply port disposed on a space-part forming surface which defines the space part, the supply port being situated on an opposite side to the direction A across the straight line L, and
   wherein the ignition-fuel-gas supply channel is configured to inject the ignition fuel gas through the supply port toward a direction A side.

* * * * *